(12) United States Patent
Pedrini

(10) Patent No.: US 7,278,815 B2
(45) Date of Patent: Oct. 9, 2007

(54) SUPPORT DEVICE FOR A STATICALLY UNSTABLE AND DYNAMICALLY STABLE PERSONAL VEHICLE

(76) Inventor: Fabio Pedrini, Via Zamboni 1/Scala-A, Piano-1, Interno-3, CAP 40125 Bologna (IT)

( * ) Notice: Subject to any disclaimer, the term of this patent is extended or adjusted under 35 U.S.C. 154(b) by 206 days.

(21) Appl. No.: 10/495,352

(22) PCT Filed: Dec. 12, 2002

(86) PCT No.: PCT/IB02/05298

§ 371 (c)(1),
(2), (4) Date: May 12, 2004

(87) PCT Pub. No.: WO03/051675

PCT Pub. Date: Jun. 26, 2003

(65) Prior Publication Data

US 2005/0013682 A1    Jan. 20, 2005

(30) Foreign Application Priority Data

Dec. 14, 2001 (IT) ................ TO2001A1165

(51) Int. Cl.
B60P 3/06 (2006.01)
B60P 9/00 (2006.01)

(52) U.S. Cl. .......... 414/462; 410/3; 224/522; 224/533

(58) Field of Classification Search .......... 414/462; 410/3; 224/522, 533, 536
See application file for complete search history.

(56) References Cited

U.S. PATENT DOCUMENTS

| 2,930,500 | A | * | 3/1960 | Ellis | 414/462 |
|---|---|---|---|---|---|
| 3,443,730 | A | * | 5/1969 | Meusel | 224/536 |
| 4,078,821 | A | * | 3/1978 | Kitterman | 280/460.1 |
| 4,705,448 | A | * | 11/1987 | Mungons | 414/462 |
| 4,741,660 | A | | 5/1988 | Kent | |
| 4,775,282 | A | * | 10/1988 | Van Vliet | 414/462 |
| 5,011,361 | A | | 4/1991 | Peterson | 414/462 |
| 5,236,342 | A | * | 8/1993 | Pellettier | 224/533 |
| 5,522,530 | A | * | 6/1996 | Boettcher | 224/488 |
| 5,816,763 | A | * | 10/1998 | Hamann et al. | 414/462 |
| 5,857,824 | A | * | 1/1999 | De Aquiar | 414/462 |
| 6,502,730 | B2 | * | 1/2003 | Johnson | 224/519 |
| 6,655,895 | B1 | * | 12/2003 | Dahl | 414/462 |
| 2003/0156930 | A1 | * | 8/2003 | Ahedo, Jr. | 414/462 |
| 2003/0165376 | A1 | * | 9/2003 | Bruno et al. | 414/462 |
| 2004/0164114 | A1 | * | 8/2004 | Fraer et al. | 224/518 |
| 2005/0057052 | A1 | * | 3/2005 | Exline | 293/117 |

FOREIGN PATENT DOCUMENTS

FR 2642378 * 8/1990 ................ 410/3
GB 2242173 A * 9/1991
WO WO 00/26059 5/2000

OTHER PUBLICATIONS

Enduro und Motocross Stander, www.mg-sport.com/german/staender.htm, Mar. 31, 2003.

* cited by examiner

Primary Examiner—James Keenan
(74) Attorney, Agent, or Firm—Boyle Fredrickson, S.C.

(57) ABSTRACT

A support device for supporting at least one statically unstable and dynamically stable personal vehicle including a platform and motor-driven wheels projecting below said platform. The support device includes a support body having at least one support surface for contacting the platform so as to support the vehicle in a statically stable position.

30 Claims, 7 Drawing Sheets

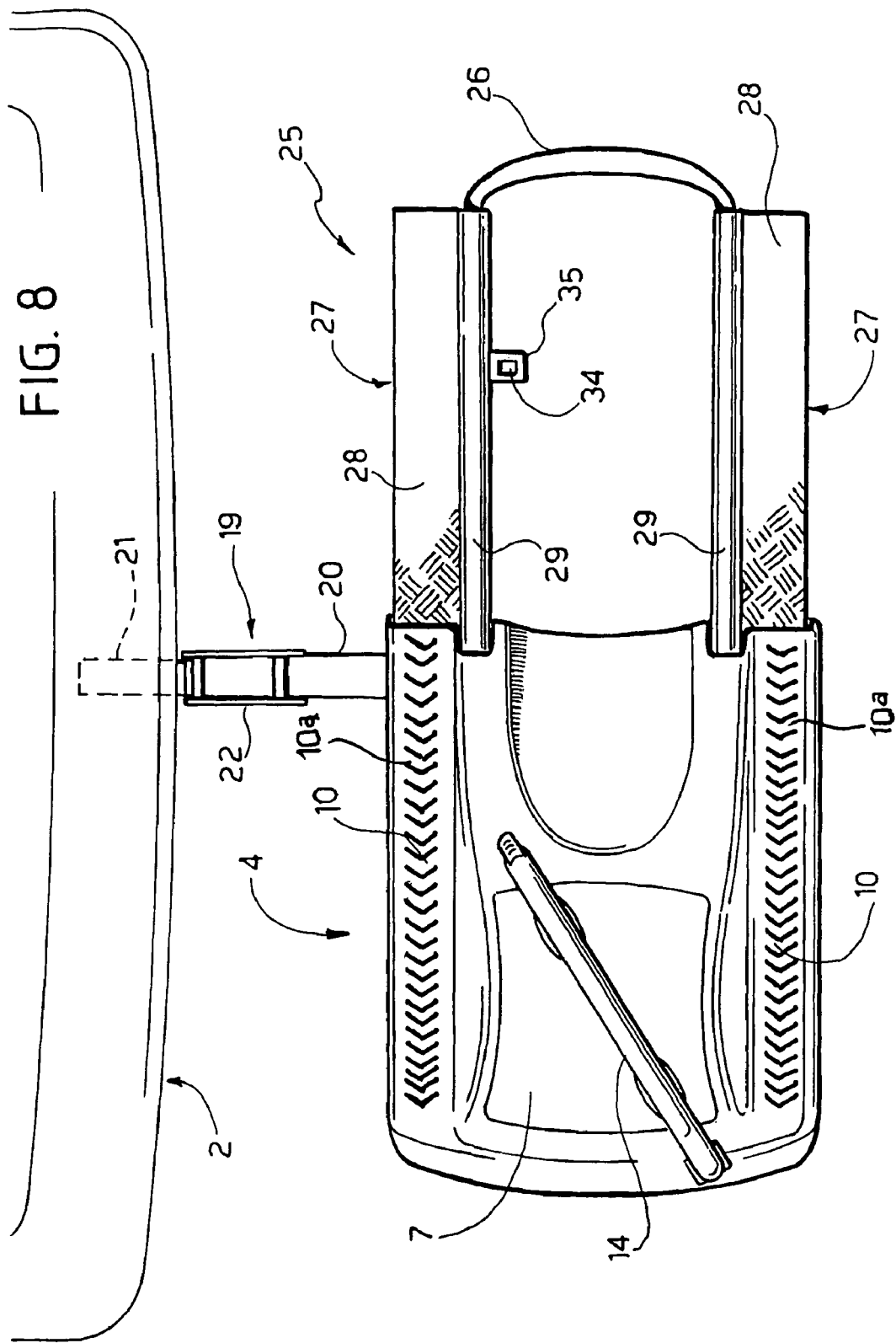

SUPPORT DEVICE FOR A STATICALLY UNSTABLE AND DYNAMICALLY STABLE PERSONAL VEHICLE

The present invention relates to a support device for supporting at least one statically unstable and dynamically stable personal vehicle of the type including a platform and motor-driven ground contacting means projecting below said platform.

The invention relates specifically to a device for supporting a small motor-driven vehicle for individual use, sometimes referred to as a human transporter, of the type disclosed in the US patent application no. US2001/0032743 in the name of Kamen et al. A vehicle of this type has been recently disclosed to the media by the inventors. This vehicle comprises a small platform having a pair of wheels with a common axis and a handle-bar placed at the upper end of an upright projecting from the platform. The user stands on the platform and holds the handle bar. The vehicle has one or more motors which control the wheels on the basis of signals provided by a gyroscopic system which detects the position of the vehicle. This kind of vehicle is statically unstable with respect to tipping when the motorised drive arrangement is not powered. Dynamic stability of the vehicle is provided by the motorised drive. In the present specification and in the claims, this kind of vehicle will be briefly referred to as "statically unstable and dynamically stable personal vehicle".

The object of the present invention is to provide a support device specifically designed for supporting a vehicle of the type disclosed in the US patent application no. US2001/0032743. A particular object of the invention is to provide a support device for carrying one or more statically unstable and dynamically stable personal vehicles on a motor vehicle such as a car or van.

The main subject of the present invention is a support device comprising a support body having at least one support surface for contacting the platform of a statically unstable and dynamically stable personal vehicle so as to support said vehicle in a statically stable position.

Preferred features of a supporting devices according to the present invention are set forth in the dependent claims.

The present invention will be disclosed in the following with reference to the attached drawings, provided purely by way of a non-limiting example, wherein:

FIGS. 7 and 8 are, respectively, a lateral view and plan view of the second embodiment of the present invention.

Figure 1:
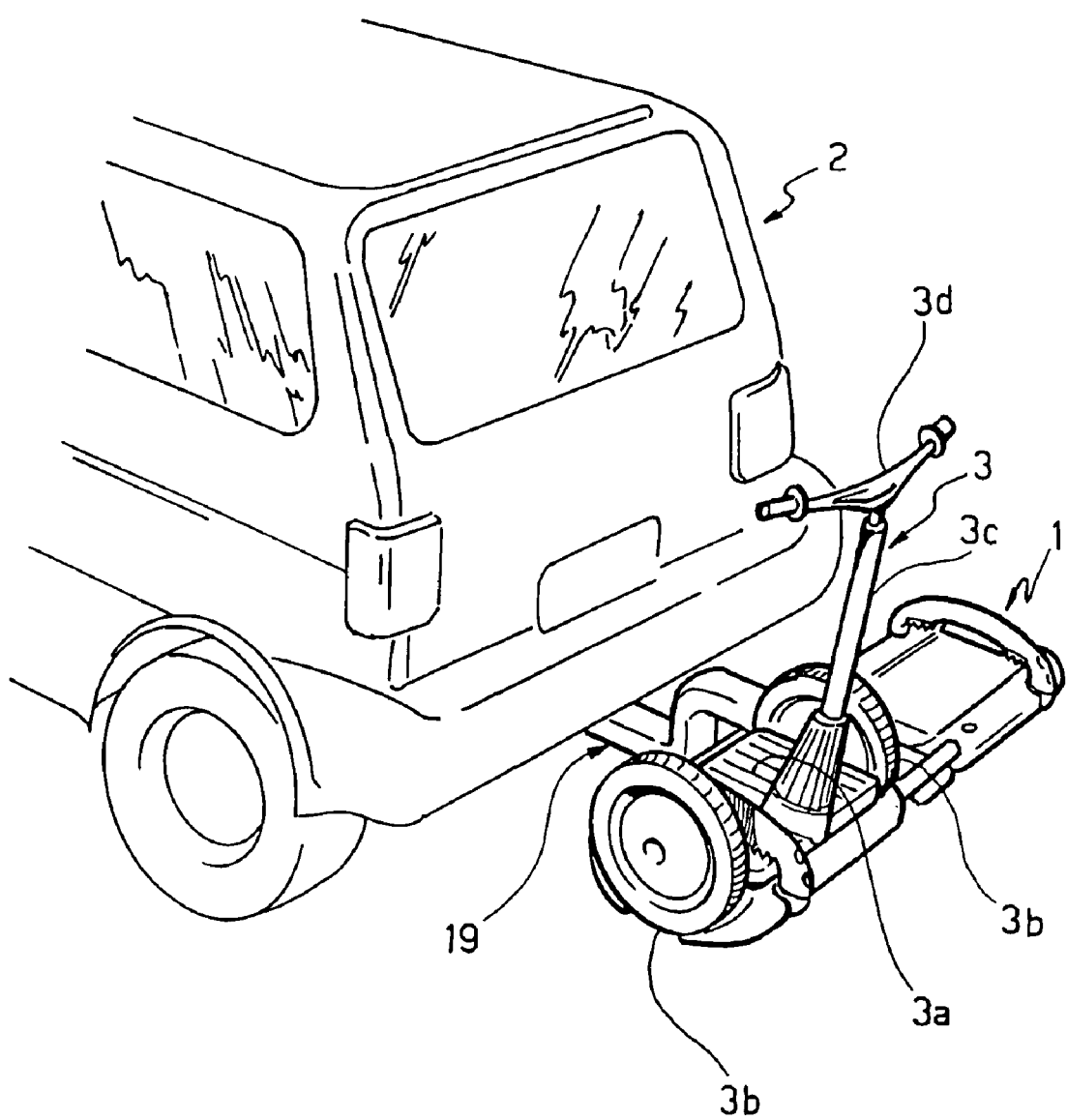
FIG. 1 is a perspective view of the rear portion of a motor vehicle carrying a device according to a first embodiment of the present invention.

With reference to FIGS. 1 to 4, the reference number 1 indicates a support device according to the present invention mounted on the rear side of a motor vehicle 2. The support device 1 is intended to carry one or two statically unstable and dynamically stable personal vehicles 3. As shown in FIG. 1, the vehicle 3 includes a horizontal platform 3a carrying a pair of wheels 3b with a common axis. An upright 3c projects from the platform 3a and a handle-bar 3d is connected to the upper end of the upright 3c.

With reference to figures from 2 to 4, the support device 1 comprises two support bodies connected to each other by two metal tubular cross-members 5. Each support body 4 comprises a shell 6 preferably made of plastic material, fixed on the cross-members 5. Each support body 4 is intended to support in a statically stable position a respective vehicle 3.

Each support body 4 has two support surfaces 7, 8 separated by a depressed portion 9. Each support surface 7, 8 may include one or more bumpers 13 of elastic material. Each support body 4 has two seats 10 having an arcuate shape placed on opposite sides of the supporting surfaces 7, 8. The two seats 10 extend below a horizontal plane passing on the support surfaces 7, 8, and each seat 10 is open at its lower end. The shape and the dimension of the seats 10 and their reciprocal distance are designed so that they can receive the two wheels 3b of a vehicle 3 supported on the support body 4. The support surfaces 7, 8 contact the lower surface of the platform 3a by means of the bumpers 13, if they are present, so as to support the vehicle 3 in a statically stable position. In the embodiment shown in the drawings, the seats 10 are specifically shaped for receiving wheels with a predetermined diameter. The seats 10 may have a different shape if the support device 1 is intended to carry a vehicle 3 having ground contacting means of a different type, as disclosed in US2001/0032743 which is herein incorporated by reference. The shape, the dimensions and the location of the seats 10 on the support body of 4 are complementary to the shape, dimensions and location of the ground contacting means of the vehicle 3. The basic idea of the present invention is to provide depressions for the ground receiving means of the vehicle 3 so that the platform 3a of the vehicle 3 rests on one or more support surfaces 7, 8 so as to hold the vehicle in a statically stable position.

Figure 2:
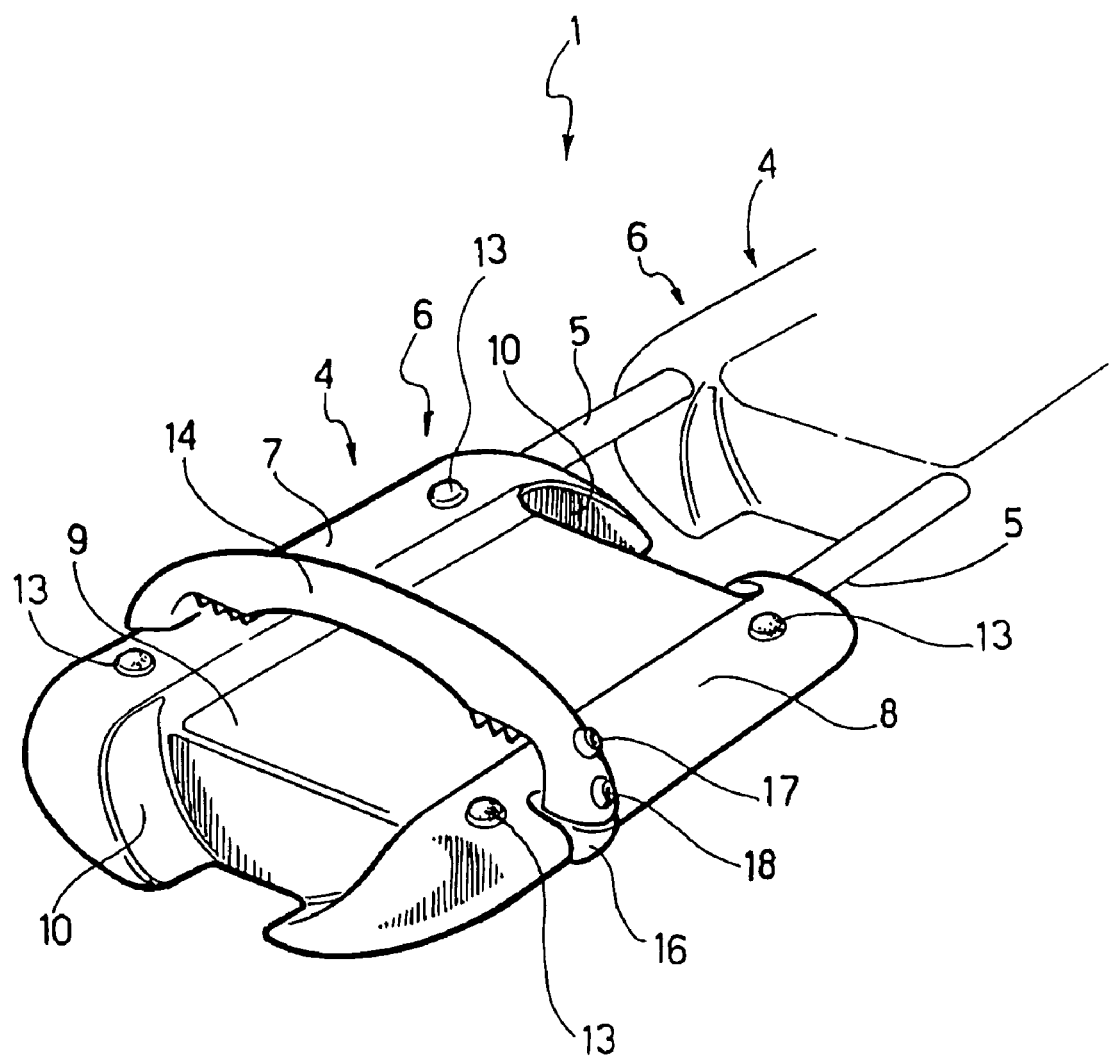
FIG. 2 is a partial perspective view in a greater scale of the device of FIG. 1, FIGS. 3 and 4 are, respectively, a lateral view and a plan view of the first embodiment of the present invention.
Figure 3:
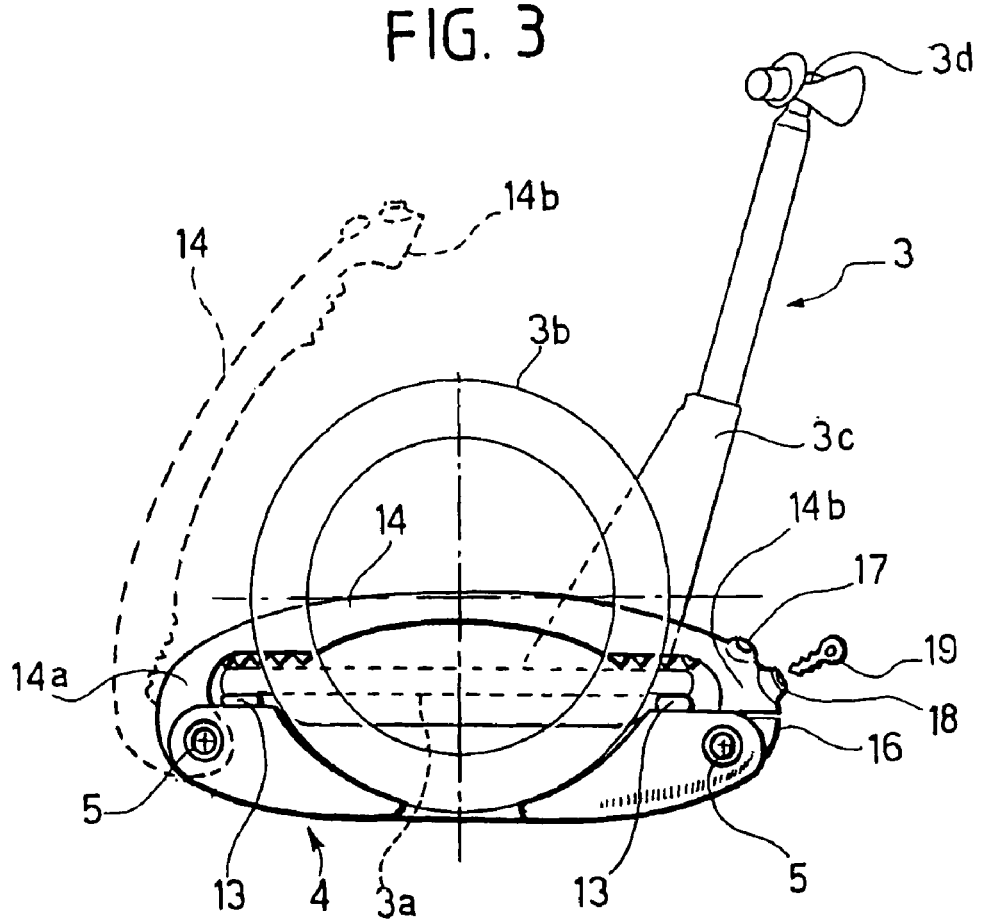
Figure 4:
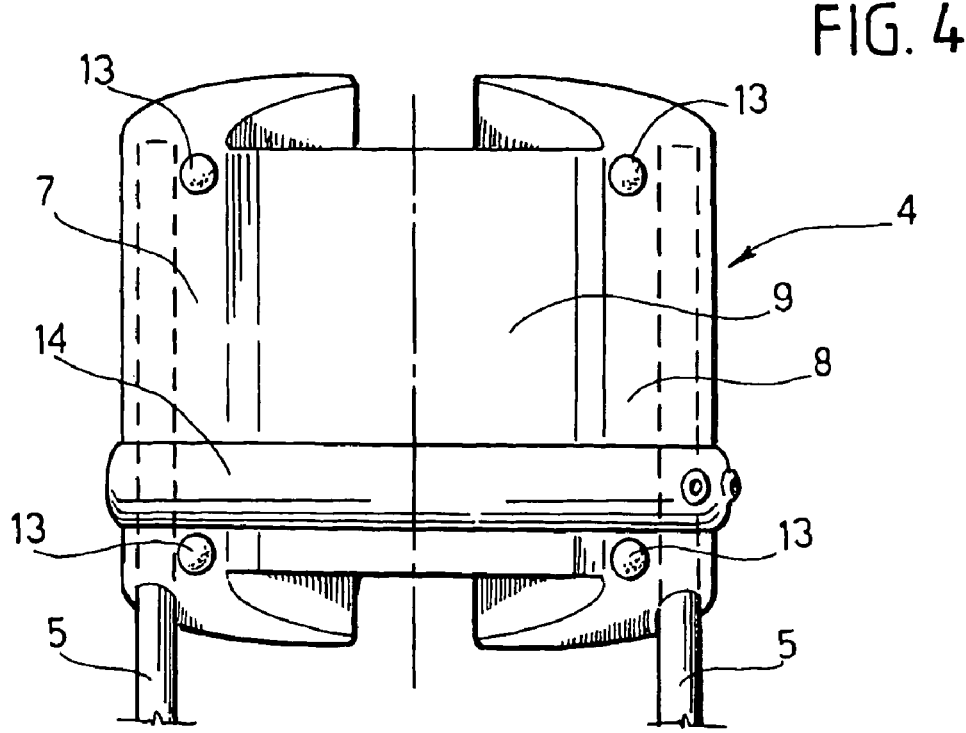

Each support body 4 is preferably associated with a retainer or latch device including a latch arm or member 14 movable between a released or raised position shown by dashed line in FIG. 3 and a lowered or engaged position shown in solid lines in FIGS. 2, 3 and 4. The latch member 14 has a first end 14a articulated to the support body 4 in proximity to the first support surface 7. The latch member 14 has a locking portion 14b cooperating with a locking receiver or seat 16 placed in correspondence with an end side of the support surface 8. The locking portion 14b can be provided with an unlocking push button 17 and possibly with a safety lock 18 which can be opened and closed by a key 19. In the embodiment shown in FIGS. 2 to 4, the latch member 14 extends along a direction orthogonal to the front sides of the support surfaces 7, 8. In its lowered position the latch member 14 extends above the platform 3a of the vehicle 3, and engages the platform 3a to hold the platform 3a in a clamp-type fashion against the support surfaces 7, 8.

As shown in FIG. 1, the support device 1 comprises a connection device 19 for connecting the device 1 to the rear hitch of the vehicle 2. The connecting device includes a metal tubular arm fixed to the tubular cross-members 5 in a position intermediate between the two support bodies 4.

A second embodiment of the present invention is shown in FIGS. 5 to 8. The elements corresponding to the ones previously disclosed are indicated by the same reference numbers. The support device 1 of this second embodiment includes a single support body for holding only one vehicle 3, although it is understood that more than one support body may be employed for holding more than one vehicle 3. The support body 4 extends laterally and in a transversal direction with respect to the connecting device 19. In this embodiment the support body 4 has a single substantially planar and horizontal support surface having a substantially rectangular shape. The latch member 14 extends along a direction substantially diagonal with respect to the support surface 7.

The connecting device 19 includes a first section 20 fixed to the support body 4, a second section 21 intended to be fixed to the rear hitch of the vehicle and a hinge section 22 for the articulated connection between the two sections 20, 21. The first section 20 can be connected to the hinge section 22 in a plurality of vertically spaced position so as to allow the user to vary the vertical position of the support device 1. The hinge section 22 allows the support device 1 to be raised into an inoperative position in which the support body 4 extends substantially parallel to the rear section of the vehicle. The connecting device 19 can also be locked in the vertical inoperative position. In the example shown in the figures, the hinged section 22 has three holes 23 for the vertical adjustment of the position of the support body 4 and three holes 24 for locking the support body 4 in the vertical inoperative position.

Figure 7:
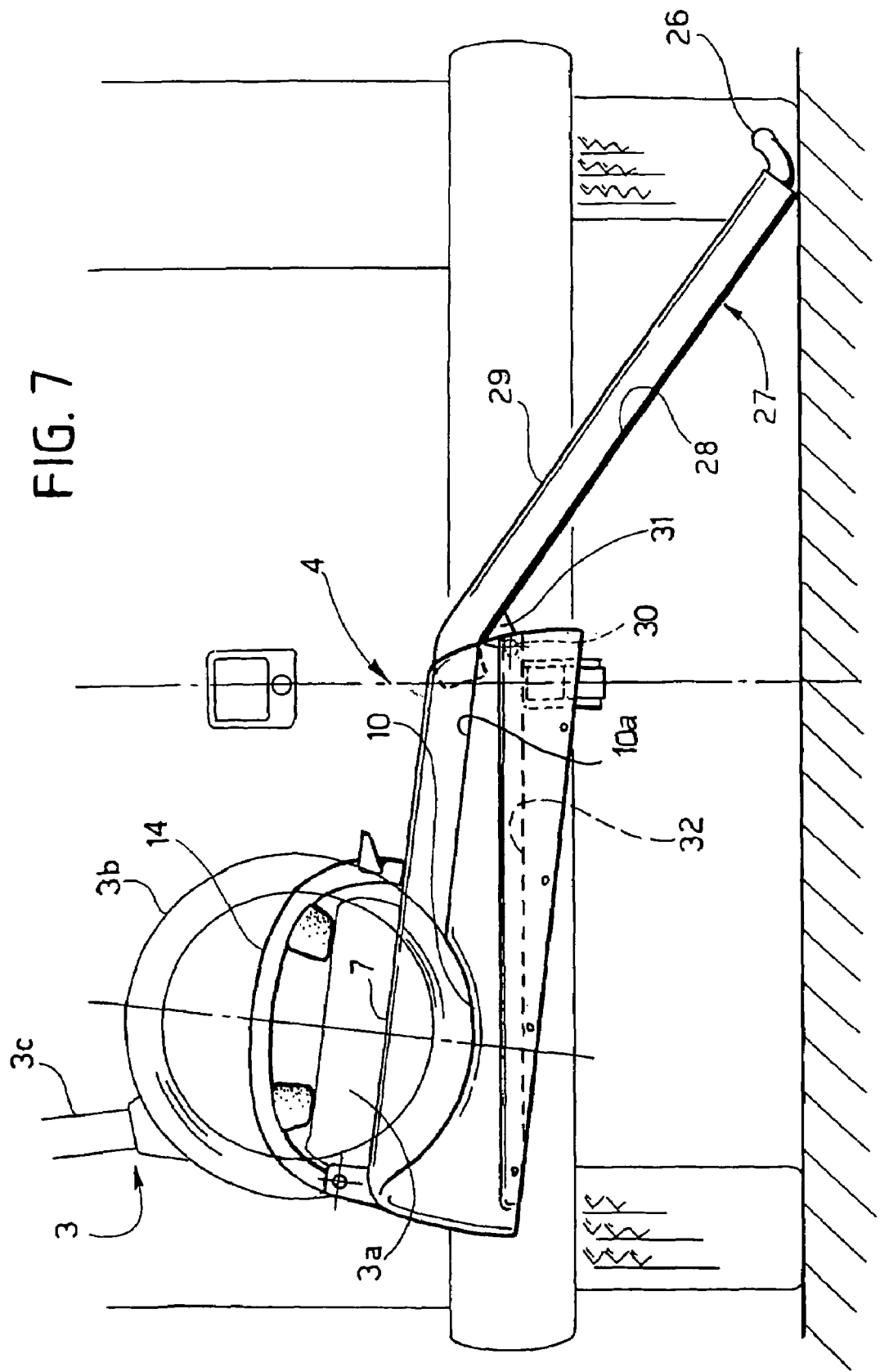

The support device 1 according to the second embodiment of the invention is preferably provided with a ramp device 25 including a pair of parallel guide elements 27 connected to each other at their ends by a handle 26. Each guide element 27 has a planar track or rest surface 28 aligned with a respective wheel-receiving seat 10. Each guide element 27 has a longitudinal rail portion 29 with a U-shaped cross section, located adjacent to the respective planar rest surface 28. Each guide element 27 may be obtained by bending a sheet metal member, for instance of aluminium. As shown in FIG. 7, each guide element 27 carries a roller 30 rotatably mounted on a flange 31 fixed to the inner end of the guide element 27. Each roller 30 can roll on a respective inner surface 32 of the support body 4.

Figure 5:
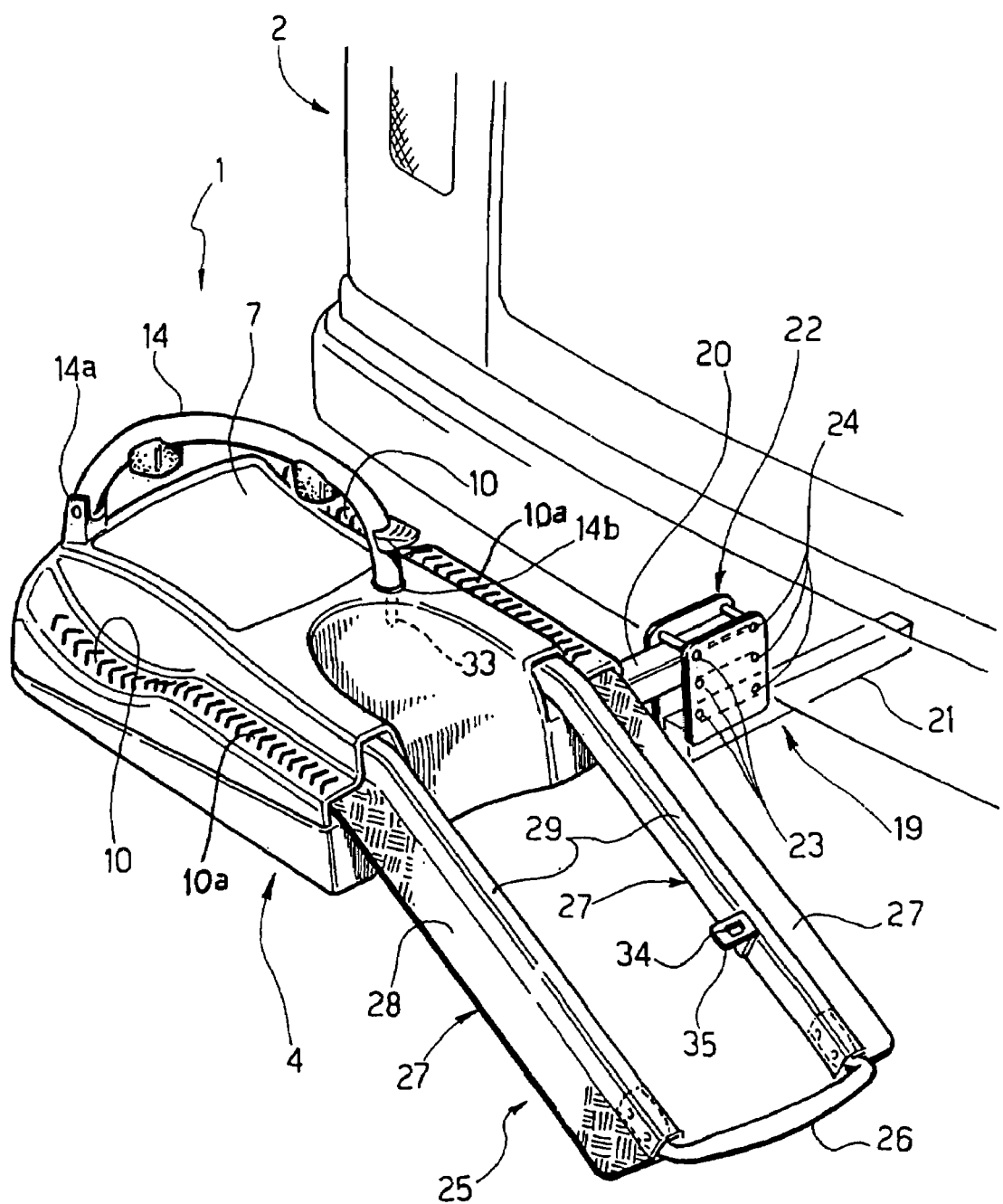
FIGS. 5 and 6 are two perspective views showing a second embodiment of the present invention.
Figure 6:
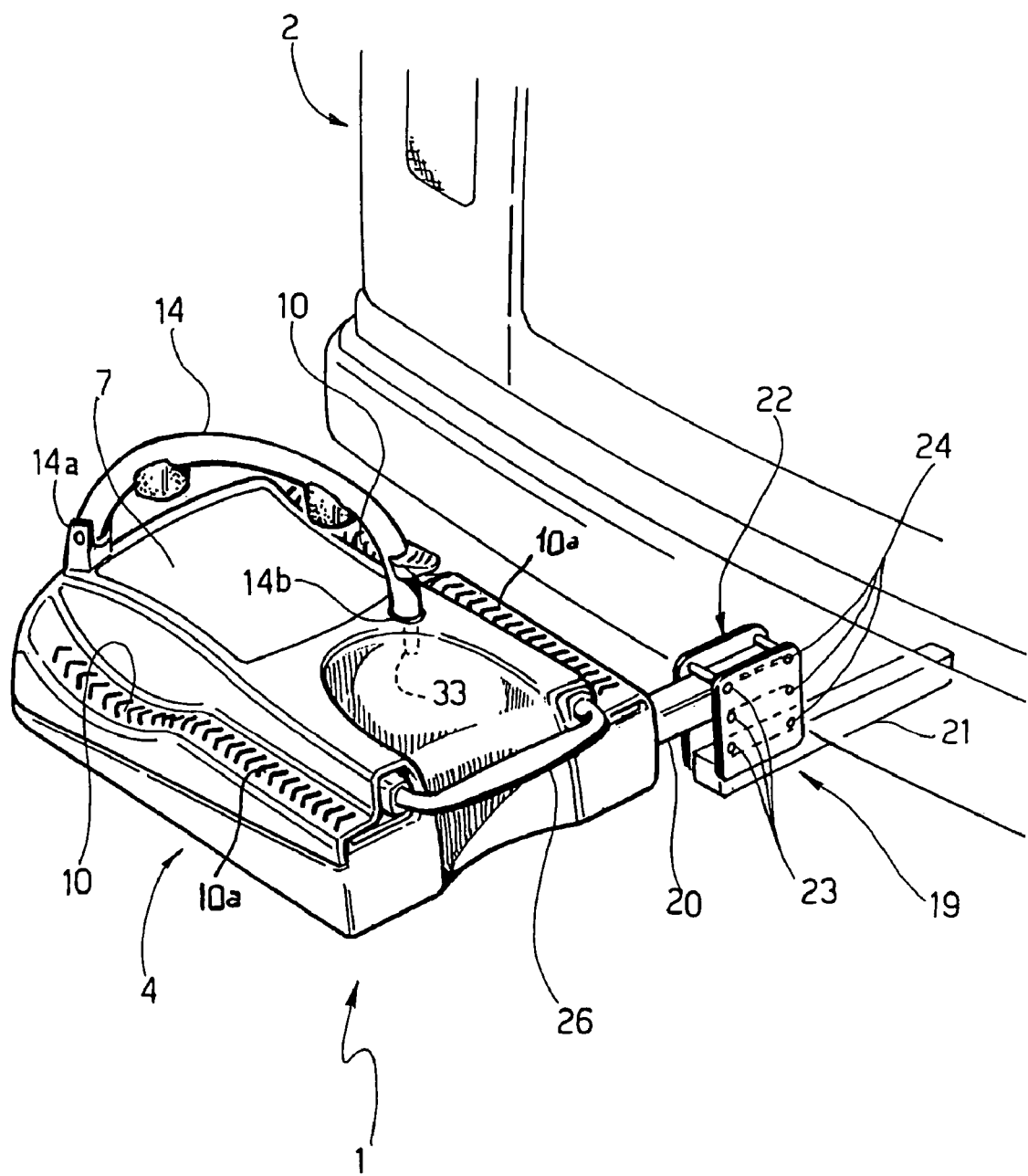

The ramp device 25 is slidably mounted inside the support body 4 and can be moved between a lowered position shown in FIGS. 5, 7 and 8 and a retracted position shown in FIG. 6. The ramp device 25 in the lowered position forms a loading ramp which connects the support body 4 to the ground and allows the user to load the vehicle 3 on the support body 4 without the need to manually raise the vehicle, and to unload the vehicle 3 from the support body 4 without the need to manually lower the vehicle. To load vehicle 3 onto support device 1, the user dismounts from the vehicle and positions the vehicle such that wheels 3b of the vehicle are aligned with rest surfaces 28. The user then operates vehicle 3 to move the vehicle up ramp device 25 onto support body 4. Vehicle 3 is unloaded from support body 4 in a reverse manner. As vehicle 3 is moved on ramp device 25 during loading or unloading, the wheels 3b of the vehicle 3 roll on the rest surfaces 28 of the guide elements 27, and rails 29 are positioned to engage wheels 3b to maintain wheels 3b in engagement with rest surfaces 28. In this embodiment, support body 4 is modified to include a track surface 10a that extends from each seat 10, to support vehicle 3 between the upper end of ramp device 25 and seat 10. The ramp device 25 is brought in its retracted position shown in FIG. 6 after loading/unloading of the vehicle 3.

Preferably the ramp device 25 is locked in the retracted position by means of the latch member 14. The locking portion 14b of the latch member 14 can be provided with a locking pin 33 which engages a hole 34 provided on a lateral flange 35 fixed to one of the guide elements 27. The lateral flange 35 is placed in a position such that this flange is in correspondence with the locking pin 33 when the ramp device 25 is in its retracted position.

In the second embodiment of FIGS. 5-8, the diagonal orientation of latch member 14 functions to provide stability to vehicle 3 in both an axial direction and a transverse direction during transport.

While the invention has been shown and described with respect to a specific embodiments, it is understood that various alternatives and modifications are contemplated as being within the scope of the present invention. For example, and without limitation, while ramp device 25 is shown as being slidable for movement between its raised and lowered positions and stored in support body 4, it is also contemplated that ramp device 25 may be pivotably mounted or stored in a separate location other than in a storage cavity defined by support body 4. Further, while latch member 14 is shown and described as engaging platform 3a of vehicle 3 to maintain vehicle 3 in engagement with support body 4, it is also understood that latch member 4 may be configured to engage one or both of wheels 3b of vehicle 3, or any other part of vehicle 3, to maintain vehicle 3 on support body 4. In addition, while ramp device 25 is shown and described as being in the form of a pair of tracks connected together by handle 26, it is understood that the ramp and handle may have any other suitable configuration. While support device 1 is shown and described as being connected to the rear hitch of vehicle 2, it is also contemplated that support device 1 may be mounted to any part of vehicle 2 or to any other support structure associated with vehicle 2 that is capable of supporting vehicle 3 and support device 1, e.g. a separate frame or the like that is permanently secured to the vehicle 2.

The invention claimed is:

1. In combination, a support device and at least one statically unstable and dynamically stable personal vehicle including a platform, laterally spaced motor-driven parallel ground contacting wheels projecting below said platform, and a handle portion located above said platform, wherein the platform defines an upwardly facing surface and a downwardly facing surface, and wherein each ground contacting wheel is located outwardly of one of a pair of opposite sides defined by the platform such that the upwardly and downwardly facing surfaces of the platform are located between the ground contacting wheels, and wherein the support device comprises a support body having at least one upwardly facing support surface, wherein the upwardly facing support surface underlies the platform and is configured such that the upwardly facing support surface contacts the downwardly facing surface defined by the platform so that engagement of the platform with the upwardly facing support surface supports said vehicle in a statically stable position; and further comprising at least one selectively engageable latch device for maintaining the downwardly facing surface defined by the platform in engagement with the upwardly facing support surface of the support body, wherein the latch device is movable between an engaged position and a release position, wherein the latch device is configured such that, in the engaged position, the latch device engages the upwardly facing surface of the platform below the handle portion and exerts a downward force on the platform that maintains the downwardly facing surface of the platform in engagement with the upwardly facing support surface, and is further configured such that, when moved to the release position, the latch device releases the downward force on the platform to enable upward movement of the platform relative to the upwardly facing support surface.

2. A combination according to claim 1, wherein said support surface is substantially planar.

3. A combination according to claim 2, wherein said support surface is substantially horizontal.

4. A combination according to claim 3, comprising at least two substantially planar support surfaces separated from each other by at least one depressed portion.

5. A combination according to claim 1, further comprising at least one seat for the ground contacting wheels.

6. A combination according to claim 5, wherein said upwardly facing support surface lies in a horizontal plane, and wherein said seat extends below the horizontal plane.

7. A combination according to claim 6, wherein said seat has a substantially arcuate shape.

8. A combination according to claim 7, comprising two seats wherein said seats are located on opposite sides defined by said support surface.

9. A combination according to claim 8, wherein each of said seats extends below the horizontal plane.

10. A combination according to claim 9, wherein said seats each have a substantially arcuate shape.

11. A combination according to claim 1, wherein said latch device comprises at least one latch member movable above said support surface, wherein said latch member in the engaged position overlies the upwardly facing surface of the platform and extends from a first side of said support surface to a second side of said support surface opposite said first side, wherein the platform is located between the first and second sides of the support surface.

12. A combination according to claim 11, wherein said latch member in the release position is raised relative to the platform to enable the platform to be moved toward and into engagement with the support surface and wherein the latch member in the engaged position is lowered into engagement with the upwardly facing surface of the platform.

13. A combination according to claim 11, wherein said latch member is articulated to the support body.

14. A combination according to claim 13, wherein said latch member has a first end articulated to the first side of said support surface and a second end having a locking portion for releasable engagement with a locking seat provided on the second side of said support surface.

15. A combination according to claim 14, wherein said locking portion includes a safety lock.

16. A combination according to claim 14, wherein said latch member extends along a direction substantially orthogonal to said first and second sides.

17. A combination according to claim 14, wherein said latch member extends along a direction substantially diagonal with respect to said first and second side.

18. A combination according to claim 1, comprising at least two support bodies each of which is adapted to maintain a respective vehicle in a statically stable position.

19. A combination according to claim 1, further comprising a connecting device for the connection of the support device to a rear hitch of a motor vehicle.

20. A combination according to claim 19, wherein said connecting device comprises height adjustment means for varying the vertical position of the support device.

21. A combination according to claim 19, wherein said connecting device comprises a first section fixed to the support body, a second section intended to be connected to the rear hitch of the motor vehicle and a hinge section between said first and second sections.

22. A combination according to claim 1, further comprising a ramp device for loading the vehicle on said support body.

23. A combination according to claim 22, wherein said ramp device includes a pair of parallel guide elements movable with respect to the support body between a retracted inoperative position and a lowered operative position.

24. A combination according to claim 23, wherein said parallel guide elements are slidably movable inside the support body.

25. A combination according to claim 24, wherein each of said guide elements has a respective rolling element which engages a rolling surface of said support body.

26. A combination according to claim 23, wherein said guide elements are connected to each other by a handle fixed to end portions of said guide elements.

27. A combination according to claim 23, wherein each of said guide elements includes a planar rest surface for supporting said wheels of a vehicle while it is loaded on said support body.

28. A combination according to claim 23, further comprising means for locking the ramp device in its retracted position.

29. A combination according to claim 28, wherein the means for locking the ramp device in its retracted position comprise a locking pin carried by a latch member articulated to the support body.

30. A combination according to claim 29, wherein said locking pin is configured to engage a hole formed in a flange projecting laterally from one of said guide elements.

* * * * *